United States Patent
Chen et al.

(10) Patent No.: US 11,385,989 B1
(45) Date of Patent: Jul. 12, 2022

(54) AUTOMATED CODE REVIEW PROCESS USING RELEVANCE ANALYSIS TO CONTROL SELECTION OF AND INTERACTION WITH CODE REVIEWERS

(71) Applicant: EMC IP Holding Company LLC, Hopkinton, MA (US)

(72) Inventors: Xiangping Chen, Sherborn, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 2 days.

(21) Appl. No.: 17/163,717

(22) Filed: Feb. 1, 2021

(51) Int. Cl.
    *G06F 11/36* (2006.01)
    *G06F 8/75* (2018.01)
    *G06F 8/71* (2018.01)

(52) U.S. Cl.
    CPC ............ *G06F 11/3616* (2013.01); *G06F 8/71* (2013.01); *G06F 8/75* (2013.01)

(58) Field of Classification Search
    CPC .......... G06F 11/3616; G06F 8/71; G06F 8/75
    USPC ....................................................... 717/120
    See application file for complete search history.

(56) References Cited

U.S. PATENT DOCUMENTS

| | | |
|---|---|---|
| 10,120,787 B1 | 11/2018 | Shemer et al. |
| 10,146,675 B1 | 12/2018 | Shemer et al. |
| 10,303,464 B1 | 5/2019 | Wolfson et al. |
| 2013/0007704 A1 | 1/2013 | Haynes et al. |
| 2016/0070568 A1* | 3/2016 | Balachandran ........... G06F 8/70 717/122 |
| 2019/0347093 A1* | 11/2019 | Challagolla ......... G06F 11/3616 |
| 2020/0226055 A1 | 7/2020 | Lavigne et al. |
| 2020/0341755 A1* | 10/2020 | Woulfe ..................... G06F 8/77 |
| 2020/0349055 A1 | 11/2020 | Reddy et al. |

OTHER PUBLICATIONS

G. Panchal et al., "Efficient Attribute Evaluation, Extraction and Selection Techniques for Data Classification," International Journal of Computer Science and Information Technologies, vol. 6, No. 2, 2015, pp. 1828-1831.

Wikipedia, "Diffusion of Responsibility," https://en.wikipedia.org/w/index.php?title=Diffusion_of_responsibility&oldid=992961322, Dec. 8, 2020, 10 pages.

* cited by examiner

*Primary Examiner* — John Q Chavis
(74) *Attorney, Agent, or Firm* — Ryan, Mason & Lewis, LLP

(57) ABSTRACT

For each of a plurality of commit operations to be executed for respective given code portions of a set of software code under development, at least one processing device performs a relevance analysis to identify one or more other code portions of the set of software code that each exhibits at least a threshold level of relevance to the given code portion, determines one or more code reviewers for the given code portion based at least in part on the one or more other code portions identified by the relevance analysis, assigns code review responsibilities for the given code portion to the one or more determined code reviewers, notifies the one or more determined code reviewers of the assigned code review responsibilities, and responsive to successful completion of code review by the one or more determined code reviewers, executes the commit operation for the given code portion.

20 Claims, 6 Drawing Sheets

RELEVANCE ANALYSIS BASED WEIGHTED RELEVANCE SCORES
FOR RESPECTIVE POTENTIAL CODE REVIEWERS

| REVIEWER ID 1 | WEIGHTED RELEVANCE SCORE BASED ON IMPACTED CODE PORTIONS {X} |
| REVIEWER ID 2 | WEIGHTED RELEVANCE SCORE BASED ON IMPACTED CODE PORTIONS {Y} |
| ... | ... |
| REVIEWER ID M | WEIGHTED RELEVANCE SCORE BASED ON IMPACTED CODE PORTIONS {Z} |

AUTOMATED CODE REVIEW PROCESS USING RELEVANCE ANALYSIS TO CONTROL SELECTION OF AND INTERACTION WITH CODE REVIEWERS

FIELD

The field relates generally to information processing systems, and more particularly to code development in information processing systems.

BACKGROUND

In a large software organization, it is common for different feature development teams in different geographic locations to be working on the same or different software releases, and for different members of different ones of the teams to be concurrently updating the same code base. This situation presents multiple continuous integration (CI) challenges. First, feature development in different releases may introduce conflicting implementations, and such conflicts are often only discovered during major release merge phase, in a highly urgent and time pressured manner. Second, it is a challenge to identify the appropriate stake holders to perform code review as development is distributed across different feature development teams, and different teams may not be aware of what other teams are up to for different releases. Such conventional arrangements can also result in duplicative efforts to resolve the same issue for different releases and different features.

SUMMARY

Illustrative embodiments disclosed herein provide techniques for automated code review using relevance analysis to control aspects of a code review process, such as selection of code reviewers and interaction with those code reviewers, to overcome significant drawbacks of alternative code review processes.

For example, in one such alternative approach, code review is solicited by notifying a group of developers, each of whom has some involvement with at least one component of the corresponding code. Unfortunately, this approach can lead to significant delays in code review completion, illustratively due to a phenomenon known as "diffusion of responsibility," where each individual in a given development group becomes increasingly less likely to take on the responsibility for code review as the number of other individuals in the group that were also notified of the need for code review increases. In other words, the more group members that receive the code review solicitation, the less likely it is that any particular one of them will take individual responsibility for the code review, with each of them assuming that one or more other group members will accept the responsibility.

Another alternative approach is to manually assign code reviewer responsibility to respective component leads, which can create work overload on the component leads and thereby further delay the code review process.

The illustrative embodiments disclosed herein overcome these and other drawbacks of the above-noted alternative approaches.

In one embodiment, an apparatus includes at least one processing device comprising a processor and a memory, with the processor being coupled to the memory. The at least one processing device is configured, for each of a plurality of commit operations to be executed for respective given code portions of a set of software code under development, to perform a relevance analysis to identify one or more other code portions of the set of software code that each exhibits at least a threshold level of relevance to the given code portion, to determine one or more code reviewers for the given code portion based at least in part on the one or more other code portions identified by the relevance analysis, to assign code review responsibilities for the given code portion to the one or more determined code reviewers, to notify the one or more determined code reviewers of the assigned code review responsibilities, and responsive to successful completion of code review by the one or more determined code reviewers, to execute the commit operation for the given code portion.

In some embodiments, the at least one processing device comprises a processing platform configured to implement an automated code reviewing system. Such an automated code reviewing system can be combined with or otherwise deployed in conjunction with an automated code testing system and/or an automated code integration system, although numerous other arrangements are possible.

Performing a relevance analysis to identify one or more other code portions of the set of software code that each exhibits at least a threshold level of relevance to the given code portion in some embodiments illustratively comprises processing code change history information for the set of software code under development to identify the one or more other code portions each exhibiting at least the threshold level of relevance to the given code portion.

Additionally or alternatively, performing a relevance analysis to identify one or more other code portions of the set of software code that each exhibits at least a threshold level of relevance to the given code portion illustratively comprises assigning different weights to respective ones of a plurality of code portions of the set of software code, and computing weighted relevance scores for respective potential code reviewers associated with the plurality of code portions. In such an arrangement, determining one or more code reviewers for the given code portion based at least in part on the one or more other code portions identified by the relevance analysis illustratively comprises selecting a potential code reviewer having a highest one of the weighted relevance scores as a determined code reviewer for the given code portion.

In some embodiments, assigning different weights to respective ones of a plurality of code portions of the set of software code comprises one or more of assigning relatively high weights to more recently changed code portions and relatively low weights to less recently changed code portions, assigning relatively high weights to code portions associated with bug fixes and relatively low weights to code portions not associated with bug fixes, and/or assigning relatively low weights to code portions associated with trace messages and relatively high weights to code portions not associated with trace messages. Other types of weight assignment techniques can be used in other embodiments.

In some embodiments, performing a relevance analysis to identify one or more other code portions of the set of software code that each exhibits at least a threshold level of relevance to the given code portion comprises executing one or more predetermined commands against a plurality of code portions of the set of software code.

As one example, the one or more commands may comprise a differential command that when executed returns one or more code portions associated with each of one or more previous commit operations.

As another example, the one or more commands may comprise an attribution command that when executed returns at least one code developer identifier and a corresponding commit identifier for one or more code portions associated with at least one previous commit operation executed for those code portions.

As yet another example, the one or more commands may comprise at least one of a context command and a purpose command that when executed return respective corresponding context and purpose information for one or more code portions associated with at least one previous commit operation executed for those code portions.

In some embodiments, determining one or more code reviewers for the given code portion based at least in part on the one or more other code portions identified by the relevance analysis illustratively comprises determining the one or more code reviewers for the given code portion subject to one or more specified review constraints, wherein the one or more specified review constraints designate one or more particular code reviewers for at least one of particular types of files, particular types of code structure, and particular types of directory changes.

Additionally or alternatively, determining one or more code reviewers for the given code portion based at least in part on the one or more other code portions identified by the relevance analysis illustratively comprises arranging identifiers of a plurality of potential code reviewers for the given code portion into a hierarchy of potential code reviewers for the given code portion based at least in part on results of the relevance analysis, selecting a first level code reviewer from a first level of the hierarchy of potential code reviewers for the given code portion, and selecting at least one additional code reviewer from at least one lower level of the hierarchy of potential code reviewers for the given code portion.

In some embodiments of this type, different code reviewers at different ones of the levels of the hierarchy perform code review at respective different granularities for the given code portion.

Determining one or more code reviewers for the given code portion based at least in part on the one or more other code portions identified by the relevance analysis in some embodiments further comprises selecting a second level code reviewer from a second level of the hierarchy of potential code reviewers for the given code portion, the second level code reviewer being selected to perform code review based on identification of a particular component impacted by the given code portion, and selecting a third level code reviewer from a third level of the hierarchy of potential code reviewers for the given code portion, the third level code reviewer being selected to perform code review based on a determination that the given code portion comprises code changes across multiple components in respective different directories.

These and other illustrative embodiments include, without limitation, apparatus, systems, methods and processor-readable storage media.

BRIEF DESCRIPTION OF THE DRAWINGS

FIG. 3 illustrates a weighting arrangement utilized in conjunction with an automated code review process using relevance analysis in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
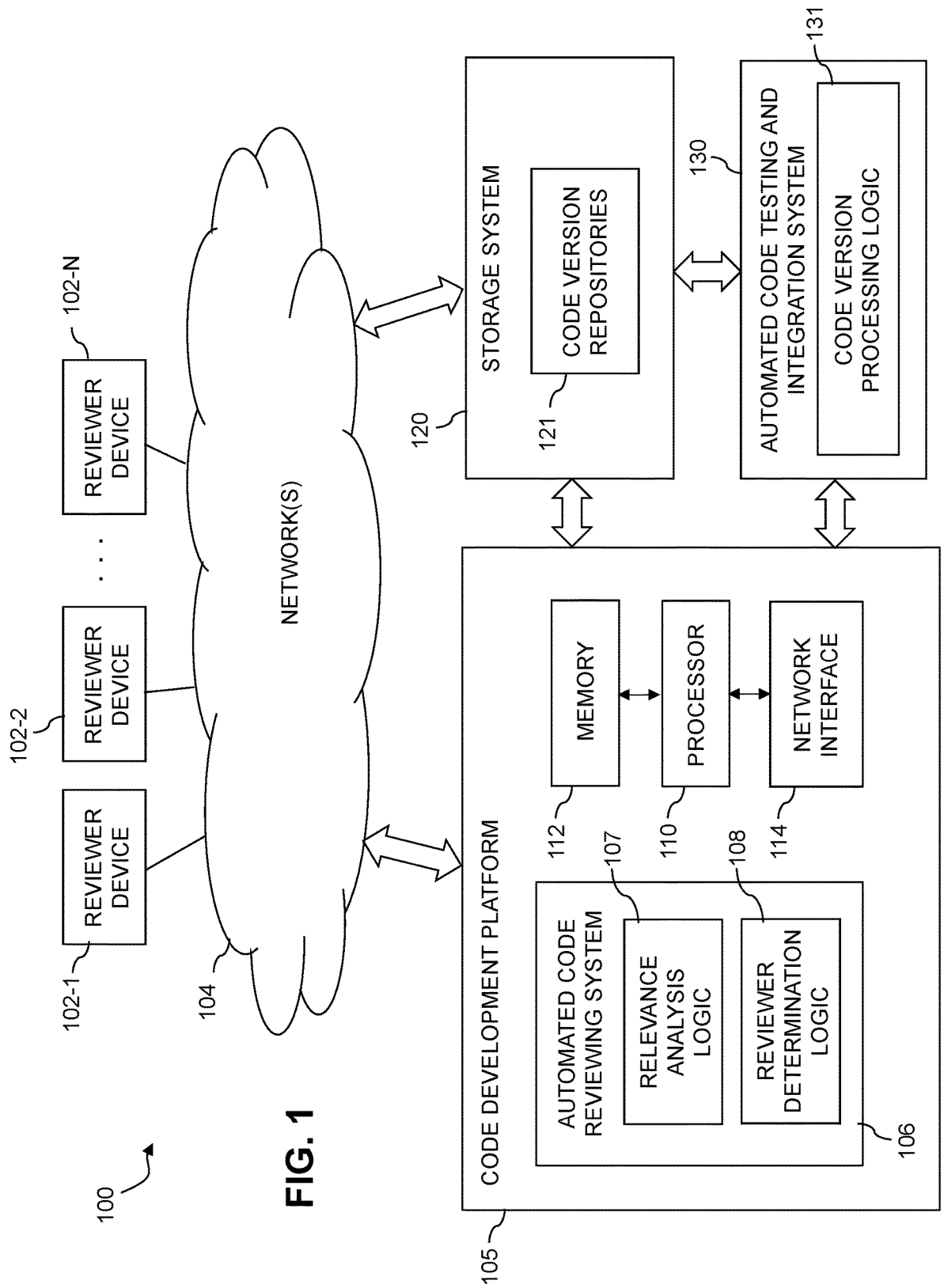
FIG. 1 is a block diagram of an information processing system implementing an automated code review process using relevance analysis to control selection of and interaction with code reviewers in an illustrative embodiment.

FIG. 1 shows an information processing system 100 configured in accordance with an illustrative embodiment. The information processing system 100 comprises a plurality of reviewer devices 102 coupled to a network 104. The reviewer devices 102 are individually denoted as reviewer devices 102-1, 102-2, . . . 102-N, where N is an arbitrary integer greater than two. Also coupled to the network 104 is a code development platform 105 that includes an automated code reviewing system 106.

The automated code reviewing system 106 comprises relevance analysis logic 107 and reviewer determination logic 108. These logic instances are illustratively configured to collectively implement at least portions of one or more automated code review processes, such as the example process shown in the flow diagram of FIG. 2. Other examples of algorithms performed by the relevance analysis logic 107 and the reviewer determination logic 108 are described elsewhere herein.

The code development platform 105 comprises one or more processing devices, including at least one processing device comprising a processor 110, a memory 112 and a network interface 114. Each of a plurality of processing devices in some implementations of the code development platform 105 can similarly include respective sets of processor, memory and network interface components. More detailed examples of such processing device components are provided elsewhere herein.

The system 100 further comprises a storage system 120 configured to include one or more code version repositories 121, and an automated code testing and integration system 130 comprising code version processing logic 131. The storage system 120 is coupled to the network 104, to the code development platform 105, and to the automated code testing and integration system 130 as shown. The automated code testing and integration system 130 can also be coupled to the network 104, although that connection is not explicitly shown in the figure. Also, in other embodiments, two or more of the code development platform 105, the storage system 120 and the automated code testing and integration system 130 can be combined into a single processing platform comprising one or more processing devices.

Although shown in the figure as a single system, the automated code testing and integration system 130 in other embodiments can be implemented as separate instances of an automated code testing system and an automated code integration system.

The reviewer devices 102 illustratively comprise respective clients or other types of computers of an enterprise computer system, cloud-based computer system or other type of processing platform. The reviewer devices 102 are illustratively associated with respective system users. The term "user" herein is intended to be broadly construed so as to encompass numerous arrangements of human, hardware, software or firmware entities, as well as combinations of such entities. Such users illustratively comprise respective "code reviewers" where that term as used herein is similarly intended to be broadly construed.

The code development platform 105, storage system 120 and automated code testing and integration system 130 in some embodiments illustratively comprise servers or other types of computers of an enterprise computer system, cloud-based computer system or other type of processing platform. For example, one or more such components can be part of cloud infrastructure such as an Amazon Web Services (AWS) system. Other examples of cloud-based systems that can be used to provide at least portions of the system 100 include Google Cloud Platform (GCP) and Microsoft Azure. Compute and/or storage services may be provided for users of system 100 under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network such as a 4G or 5G network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

The storage system 120 illustratively comprises a plurality of storage devices, illustratively comprising solid state drives (SSDs). Such SSDs are implemented using non-volatile memory (NVM) devices such as flash memory. Other types of NVM devices that can be used to implement at least a portion of the storage devices include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

It is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, storage system 120 is associated with one or more host devices that are not explicitly shown in the figure. Such host devices illustratively communicate with the storage devices of the storage system 120 using Small Computer System Interface (SCSI) and/or NVM Express (NVMe) commands, possibly in accordance with storage access protocols such as Internet SCSI (iSCSI), NVMe over Fabric (NVMeF) and NVMe over Transmission Control Protocol (NVMe/TCP).

In some embodiments, the storage system 120 illustratively comprises a scale-out all-flash content addressable storage array such as an XtremIO™ storage array from Dell Technologies. A wide variety of other types of storage arrays can be used in implementing the storage system 120 in other embodiments, including by way of example one or more Unity™ or PowerMax™ storage arrays, commercially available from Dell Technologies. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

The information processing system 100 is illustratively configured to provide functionality that is referred to herein as "automated code review" using relevance analysis to control aspects of a code review process, such as selection of code reviewers and interaction with those code reviewers, so as to overcome significant drawbacks of alternative code review processes.

For example, these and other illustrative embodiments disclosed herein overcome the previously-described issues relating to diffusion of responsibility, where code review solicitations are too broadly sent, making it less likely that any particular recipient will take responsibility for the code review, as well as issues relating to manual assignment of code reviewer responsibility to respective component leads, which can create work overload on the component leads and thereby further delay the code review process.

In accordance with the automated code review functionality, the automated code reviewing system 106 of code development platform 105 in system 100 is illustratively configured, for each of a plurality of commit operations to be executed for respective given code portions of a set of software code under development in the code development platform 105, to perform a relevance analysis via relevance analysis logic 107 to identify one or more other code portions of the set of software code that each exhibits at least a threshold level of relevance to the given code portion, and to determine one or more code reviewers for the given code portion via reviewer determination logic 108 based at least in part on the one or more other code portions identified by the relevance analysis.

The automated code reviewing system 106 also assigns code review responsibilities for the given code portion to the one or more determined code reviewers, notifies the one or more determined code reviewers of the assigned code review responsibilities, illustratively by sending respective messages to the corresponding reviewer devices 102 over the network 104, and responsive to successful completion of code review by the one or more determined code reviewers, to execute the commit operation for the given code portion.

The execution of the commit operation in some embodiments comprises the automated code reviewing system 106 sending an indication to the automated code testing and integration system 130 that the given code portion has successfully completed its review and is therefore to be integrated into a designated code base or other type of code version for the set of software code under development. Numerous other types of execution of a commit operation are possible, and terms such as "executing a commit operation" as used herein are therefore intended to be broadly construed.

In some embodiments, performing a relevance analysis using relevance analysis logic 107 to identify one or more other code portions of the set of software code that each exhibits at least a threshold level of relevance to the given code portion illustratively comprises processing code change history information for the set of software code under development to identify the one or more other code portions each exhibiting at least the threshold level of relevance to the given code portion.

Additionally or alternatively, performing a relevance analysis using relevance analysis logic 107 to identify one or more other code portions of the set of software code that each exhibits at least a threshold level of relevance to the given code portion illustratively comprises assigning different weights to respective ones of a plurality of code portions of the set of software code, and computing weighted relevance scores for respective potential code reviewers associated with the plurality of code portions.

An example of a set of relevance analysis based weighted relevance scores computed for respective potential code reviewers will be described in more detail below in conjunction with FIG. 3.

In such an arrangement, determining one or more code reviewers for the given code portion using reviewer determination logic 108 based at least in part on the one or more other code portions identified by the relevance analysis illustratively comprises selecting a potential code reviewer having a highest one of the weighted relevance scores as a determined code reviewer for the given code portion.

In some embodiments, assigning different weights to respective ones of a plurality of code portions of the set of software code comprises one or more of assigning relatively high weights to more recently changed code portions and relatively low weights to less recently changed code portions, assigning relatively high weights to code portions associated with bug fixes and relatively low weights to code portions not associated with bug fixes, and/or assigning relatively low weights to code portions associated with trace messages and relatively high weights to code portions not associated with trace messages. Other types of weight assignment techniques can be used in other embodiments.

In some embodiments, performing a relevance analysis using relevance analysis logic 107 to identify one or more other code portions of the set of software code that each exhibits at least a threshold level of relevance to the given code portion illustratively comprises executing one or more predetermined commands against a plurality of code portions of the set of software code.

As one example, the one or more commands may comprise a differential command that when executed returns one or more code portions associated with each of one or more previous commit operations.

As another example, the one or more commands may comprise an attribution command that when executed returns at least one code developer identifier and a corresponding commit identifier for one or more code portions associated with at least one previous commit operation executed for those code portions.

As yet another example, the one or more commands may comprise at least one of a context command and a purpose command that when executed return respective corresponding context and purpose information for one or more code portions associated with at least one previous commit operation executed for those code portions.

In some embodiments, determining one or more code reviewers for the given code portion using reviewer determination logic 108 based at least in part on the one or more other code portions identified by the relevance analysis illustratively comprises determining the one or more code reviewers for the given code portion subject to one or more specified review constraints, wherein the one or more specified review constraints designate one or more particular code reviewers for at least one of particular types of files, particular types of code structure, and particular types of directory changes.

Additionally or alternatively, determining one or more code reviewers for the given code portion using reviewer determination logic 108 based at least in part on the one or more other code portions identified by the relevance analysis illustratively comprises arranging identifiers of a plurality of potential code reviewers for the given code portion into a hierarchy of potential code reviewers for the given code portion based at least in part on results of the relevance analysis, selecting a first level code reviewer from a first level of the hierarchy of potential code reviewers for the given code portion, and selecting at least one additional code reviewer from at least one lower level of the hierarchy of potential code reviewers for the given code portion.

An example of a hierarchy of potential code reviewers for the given code portion will be described in more detail below in conjunction with FIG. 4.

In some embodiments of this type, different code reviewers at different ones of the levels of the hierarchy perform code review at respective different granularities for the given code portion.

Determining one or more code reviewers for the given code portion using reviewer determination logic 108 based at least in part on the one or more other code portions identified by the relevance analysis in some embodiments further comprises selecting a second level code reviewer from a second level of the hierarchy of potential code reviewers for the given code portion, the second level code reviewer being selected to perform code review based on identification of a particular component impacted by the given code portion, and selecting a third level code reviewer from a third level of the hierarchy of potential code reviewers for the given code portion, the third level code reviewer being selected to perform code review based on a determination that the given code portion comprises code changes across multiple components in respective different directories.

The above-described features of the automated code reviewing system 106 and its corresponding relevance analysis logic 107 and reviewer determination logic 108 are presented by way of example only, and can be varied in other embodiments.

Additional illustrative embodiments will now be described with reference to an example algorithm for automated code review. The assumptions made in conjunction with description of these embodiments below need not apply in other embodiments.

In the context of this example algorithm and other illustrative embodiments herein, the automated code review functionality automates a code review process using relevance analysis based on code changing history and other related information, and by dividing code review responsibilities to stake holders whose code contributions are highly relevant to the pending code commits, thereby ensures that high-quality code review can be accomplished in a timely and efficient manner.

The example algorithm illustratively makes use of a source code control system in implementing its automated code review functionality.

Taking the source code control system git as an example, a git diff command gives information on which lines of code have changed with the code commits; a git blame command gives author information and commit ID for each line of code; and git show and git log commands give context and purpose information for each commit. A relevance analysis program implemented by relevance analysis logic 107 of the automated code reviewing system 106 utilizes these and possibly other git commands to identify which code by which developer will be replaced or otherwise modified the most by the particular commit to be pushed, and whose past and current work would be potentially impacted.

In determining which lines of code are critical to the particular commit, different lines of code are assigned different weights. For example, more recently changed code is assigned a higher weight than less recently changed code, code addressing fixes to high priority bugs is assigned relatively high weight, code associated with trace messages is assigned relatively low weight, and so on. A weighted score is then computed for each contributor involved, and one or more of the code contributors with the highest scores are identified as the most relevant reviewers in the code review process.

The automated code reviewing system 106 in the present embodiment is configured to identify and notify a highly-relevant set of code reviewers responsive to detection of a commit for a code portion. Such code reviewers in some embodiments include relevant developers and technology leads that are determined by automated code reviewing system 106 to be associated with the greatest impacts from the changes in the code portion.

The above-noted example algorithm providing automated code review illustratively includes the following steps:

1. The automated code reviewing system 106 receives an indication that a code developer is ready to push a commit on a piece of code. Such a piece of code is an example of what is more generally referred to herein as a "code portion."

2. The automated code reviewing system 106 identifies one or more first-level code reviewers based on relevance analysis of the most recent contributors of the same code area. The one or more first-level code reviewers, also referred to herein as "primary" code reviewers, are illustratively responsible for initial code review, and for spotting potential inconsistencies with past implementations and conflicts in concurrent implementation. The primary code reviewers have incentives to perform good review, as regression caused by new code change may become their responsibility.

In cases in which an original contributor/owner has left the organization, an automatic delegate/forward list may be established to specify the new owner of the code area, and code review notification/responsibility will be automatically forwarded to the new owner.

Additionally or alternatively, the automated code reviewing system 106 can be configured to take into account various types of constraints in selecting code reviewers from a first level or other levels of a hierarchy, such as constraints related to changes to files or structures. For example, such constraints can include:

John should review any changes to files rep*.*;

Mary should review any changes that involve structure XXX; and

Xiangping should be a second-level reviewer for any changes in directory TestPlan.

2. The automated code reviewing system 106 identifies one or more second-level code reviewers by identifying the most significant contributor or contributors to one or more impacted components. The second-level code reviewer list can be automatically generated by counting the most critical lines of code in the directory, or by specifying owners in a special component owner list.

The one or more second-level code reviewers are illustratively responsible for component level code review, and for spotting potential conflicts or missing pieces in different features which require changes in the same component.

3. If the code changes are across multiple directories/components, the automated code reviewing system 106 further identifies one or more third-level stake holders for code review. The third-level code reviewers are usually release tech leads or architects of an entire release, and are responsible for system and release level review.

4. Once the automated code reviewing system 106 identifies one or more code reviewers in each level as described above, it automatically notifies the identified code reviewers to perform code review. Each level code reviewers (or their delegates) can then perform code review at different granularities.

5. After all code reviewers have approved the change specified by the commit, the commit can continue on next stage of an integration process, illustratively in an integration portion of the automated code testing and integration system 130.

Advantageously, the example algorithm described above automatically identifies the most critical code reviewers, reduces code review group size, clarifies the responsibilities of each code reviewer, and distributes scope and load of each code reviewer to ensure timely high-quality code review regardless of other testing or integration processes.

Additional or alternative steps may be used in such an algorithm in other embodiments. Also, the ordering of the steps can be varied, and different portions of the algorithm can be performed at least in part in parallel with one another.

These and other operations associated with automated code review are illustratively performed at least in part by or under the control of the automated code reviewing system 106, using its logic instances 107 and 108.

Again, these and other particular features associated with the above-described algorithm are presented by way of illustrative example only, and need not be present in other embodiments disclosed herein.

The system 100 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. Different components of the system 100 may be implemented on respective distinct processing platforms, although numerous other arrangements are possible.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location.

Thus, it is possible in some implementations of the system 100 for different portions of the system 100 to reside in different data centers. Numerous other distributed implementations of the system 100 and its components are possible.

Additional examples of processing platforms utilized to implement storage systems and possibly their associated host devices in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as reviewer devices 102, code development platform 105, automated code reviewing system 106, logic instances 107 and 108, storage system 120 and automated code testing and integration system 130 can be used in other embodiments.

It should be understood that the particular systems, logic instances and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, at least portions of the automated code review functionality can be implemented in other types of processing platforms or other arrangements of one or more processing devices.

Accordingly, illustrative embodiments are not limited to arrangements in which all such functionality is implemented in single processing platform, and therefore encompass various hybrid arrangements in which the functionality is distributed over multiple processing platforms each comprising one or more processing devices.

The operation of the information processing system 100 will now be described in further detail with reference to the flow diagram of the illustrative embodiment of FIG. 2, which implements a process for automated code review.

Figure 2:
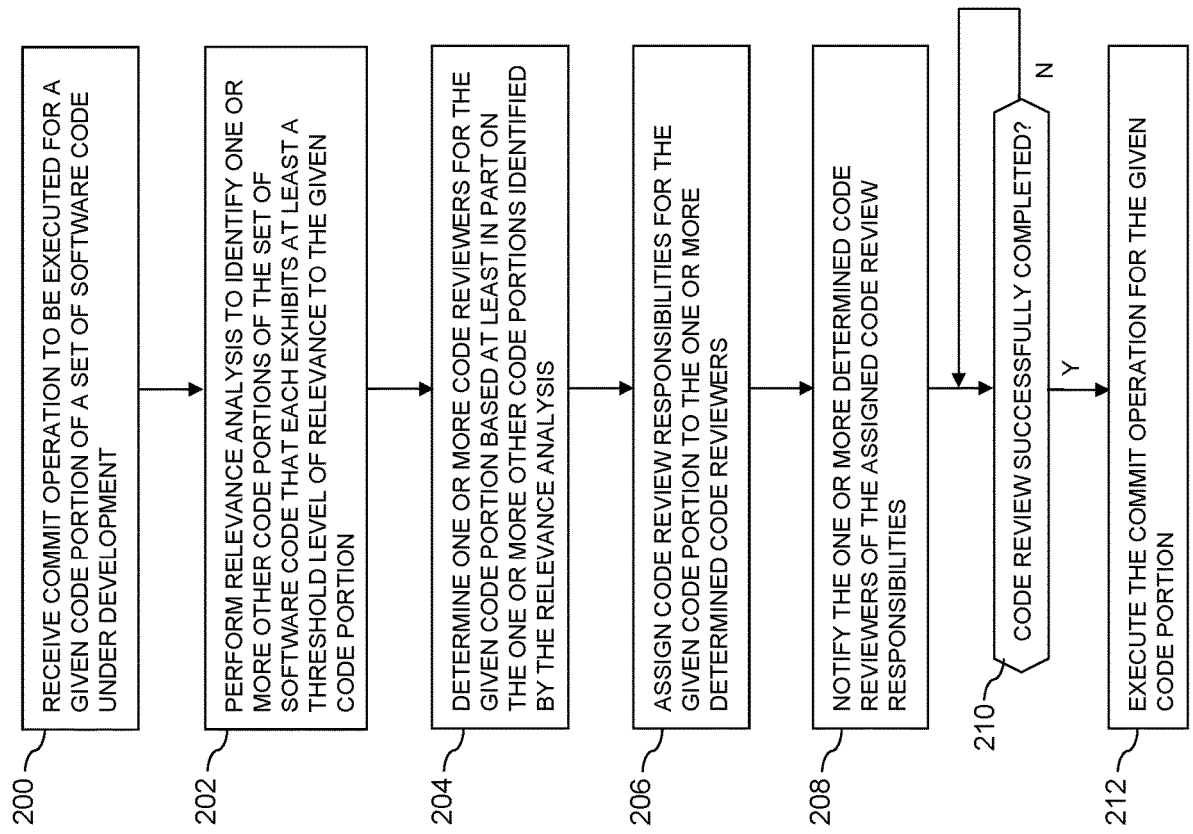
FIG. 2 is a flow diagram illustrating an example automated code review process using relevance analysis to control selection of and interaction with code reviewers in an illustrative embodiment.

The process as illustrated in FIG. 2 includes steps 200 through 212, and is suitable for use in system 100 but is more generally applicable to a wide variety of other types of information processing systems implementing automated code review functionality. The process as shown is illustratively performed primarily by the code development platform 105 utilizing its automated code reviewing system 106 comprising relevance analysis logic 107 and reviewer determination logic 108.

In step 200, the automated code reviewing system 106 receives a commit operation to be executed for a given code portion of a set of software code under development in the code development platform 105. Such a commit operation is illustratively triggered by a particular code developer working on the given code portion, after a development process for the given code portion is complete and the given code portion is ready for review. At this point, the code developer is committing to the given code portion, such that the given code portion can be integrated into a code base or other code version after successful completion of an automated code review process.

In step 202, the automated code reviewing system 106 via its relevance analysis logic 107 performs relevance analysis to identify one or more other code portions of the set of software code that each exhibits at least a threshold level of relevance to the given code portion. Detailed examples illustrating such relevance analysis are described in more detail elsewhere herein.

In step 204, the automated code reviewing system 106 via its reviewer determination logic 108 determines one or more code reviewers for the given code portion based at least in part on the one or more other code portions identified by the relevance analysis. Again, detailed examples illustrating the manner in which code reviewers are determined using relevance analysis results are described elsewhere herein.

In step 206, the automated code reviewing system 106 assigns code review responsibilities for the given code portion to the one or more determined code reviewers. Such an assignment for a given one of the determined code reviewers illustratively defines the particular type of review that is to be performed. For example, different reviews can be performed at different granularities by different code reviewers associated with respective different levels of a code reviewer hierarchy of the type disclosed herein.

In step 208, the automated code reviewing system 106 notifies the one or more determined code reviewers of the assigned code review responsibilities. For example, messages are illustratively sent by the automated code reviewing system 106 over the network 104 to corresponding reviewer devices 102 of the determined code reviewers.

In step 210, a determination is made by the automated code reviewing system 106 as to whether or not the code review has been successfully completed. Successful completion of the code review is illustratively indicated by each of the determined code reviewers providing an indication back to the automated code reviewing system 106 that the code review responsibilities assigned to that code reviewer have been fully met and that no further modification or other adjustment in the given code portion is required. It is also possible in some embodiments that one or more of the code reviewers may request modification or other adjustment in the given code portion in conjunction with their code review, which may trigger an additional round of code review for the modified or otherwise adjusted code portion.

In step 212, which is reached only after all of the code reviewers that were assigned code review responsibilities for the given code portion successfully complete their reviews, the commit operation is executed, illustratively by the automated code reviewing system 106 providing an indication of successful code review completion to the automated code testing and integration system 130, which uses its code version processing logic 131 to update a code base or other code version to include the given code portion. The updated code version is then stored in one of the code version repositories 121.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for automated code review. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another for respective different automated code review instances performed for respective different sets of code or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, code development platform 105 comprising automated code reviewing system 106, and its logic instances 107 and 108 that perform at least portions of one or more steps of the FIG. 2 process, can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The logic instances 107 and 108 of the automated code reviewing system 106, as well as other system components, may be implemented at least in part using processing devices of such processing platforms. For example, in a distributed implementation of the code development platform 105, respective distributed modules of such a code development platform can be implemented in respective containers running on respective ones of the processing devices of a processing platform.

Additional illustrative embodiments will now be described in more detail with reference to FIGS. 3 and 4.

Referring initially to FIG. 3, an example weighted relevance score arrangement 300 based on relevance analysis is shown, for utilization in conjunction with an automated code review process in an illustrative embodiment. The weighted relevance score arrangement 300 in this embodiment more particularly comprises a set of relevance analysis based weighted relevance scores for respective potential code reviewers. The weighted relevance scores as shown include M weighted relevance scores, associated with respective potential code reviewers having identifiers given by Reviewer ID 1, Reviewer ID 2, . . . Reviewer ID M. Different ones of the weighted relevance scores are based on respective different sets of impacted code portions associated with the corresponding potential code reviewer. For example, the weighted relevance score for Reviewer ID 1 is based on a first set of impacted code portions {X} that are associated with that potential code reviewer. Similarly, the weighted relevance score for Reviewer ID 2 is based on a second set of impacted code portions {Y} that are associated with that potential code reviewer, and the weighted relevance score for Reviewer ID M is based on an M-th set of impacted code portions {Z} that are associated with that potential code reviewer.

In generating the weighted relevance score arrangement 300 in the FIG. 3 embodiment, the relevance analysis logic 107 of automated code reviewing system 106 illustratively performs a relevance analysis for a given code portion of a set of software code under development, in order to identify one or more other code portions of the set of software code that each exhibits at least a threshold level of relevance to the given code portion. This illustratively involves assigning different weights to respective ones of a plurality of code portions of the set of software code, and computing the weighted relevance scores of the weighted relevance score arrangement 300 shown in FIG. 3 for respective potential code reviewers, based on the particular ones of the code portions that are associated with each of the potential code reviewers.

As indicated above, different ones of the code reviewers are illustratively associated with different sets of impacted code portions, shown by respective code portion sets {X}, {Y} and {Z}. Accordingly, different weighted relevance scores are generated for the different code reviewers associated with the different sets of impacted code portions, based on the weights assigned to the respective impacted code portions.

In such an embodiment, the one or more code reviewers are selected based on the weighted relevance scores. For example, the reviewer determination logic 108 can select a potential code reviewer having a highest one of the weighted relevance scores in the weighted relevance score arrangement 300 as a determined code reviewer for the given code portion.

Figure 4:
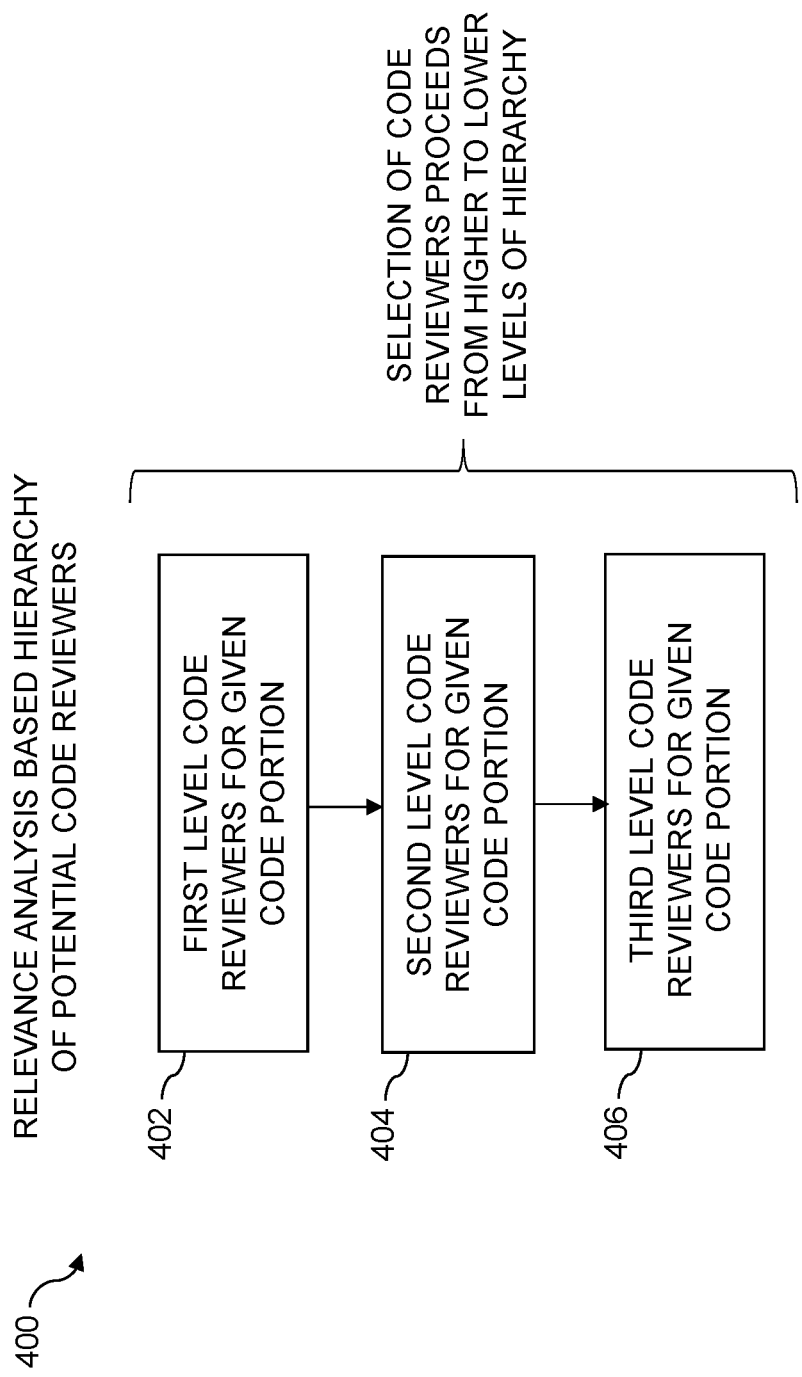
FIG. 4 illustrates a hierarchy of potential code reviewers utilized in conjunction with an automated code review process using relevance analysis in an illustrative embodiment.

Turning now to FIG. 4, an example hierarchy 400 of potential code reviewers based on relevance analysis is shown, for utilization in conjunction with an automated code review process in an illustrative embodiment. In the hierarchy 400, identifiers of a plurality of potential code reviewers for the given code portion are arranged into different levels based at least in part on results of the relevance analysis performed by the relevance analysis logic 107 of the automated code reviewing system 106. The different levels of code reviewers for the given code portion in this example include a first level 402, a second level 404 and a third level 406. It is to be appreciated that smaller or larger numbers of levels can be used in other hierarchies of potential code reviewers in other embodiments.

In this embodiment, it is assumed that selection of code reviewers proceeds from a relatively high level such as the first level 402 to a relatively low level such as third level 406, although other arrangements are possible.

For example, in some embodiments, a first level code reviewer is selected from the first level 402 of the hierarchy 400 of potential code reviewers for the given code portion, and at least one additional code reviewer is selected from at least one lower level of the hierarchy 400 of potential code reviewers for the given code portion, such as second level 404 and/or third level 406. Different ones of the code reviewers at different ones of the levels 402, 404 and 406 of the hierarchy 400 illustratively perform code review at respective different granularities for the given code portion.

As another example, in some embodiments, in addition to the selection of the first level code reviewer from the first level 402 of the hierarchy 400, a second level code reviewer is selected from the second level 404 of the hierarchy 400 of potential code reviewers for the given code portion, with the second level code reviewer being selected to perform code review based on identification of a particular component impacted by the given code portion, and a third level code reviewer is selected from the third level 406 of the hierarchy 400 of potential code reviewers for the given code portion, with the third level code reviewer being selected to perform code review based on a determination that the given code portion comprises code changes across multiple components in respective different directories.

As a further example of an illustrative embodiment utilizing the weighted relevance score arrangement 300 of FIG. 3 and the hierarchy 400 of potential code reviewers of FIG. 4, weights can be assigned to respective lines or other designated code portions of the set of software code to indicate corresponding degrees of impact on those designated code portions from the proposed changes in the given code portion. Such weights can be generated, for example, based on frequency of appearance in the set of software code, as determined using a static code analysis tool or a runtime program profiling tool.

Different types of weighted relevance scores are illustratively used for different potential code reviewers associated with different ones of the multiple levels of the hierarchy 400 of potential code developers.

In such an arrangement, the first-level code reviewers of first level 402 in hierarchy 400 illustratively have weighted relevance scores that represent weighted sums of all code portions modified from an existing code base in a particular development branch that includes the developer that generated the commit for the given code portion. For example, assume the relevance analysis logic 107 determines that the commit for the given code portion modified 100 lines of code of Developer 1 with a weighted sum of 300, and modified 200 lines of code of Developer 2 with a weighted sum of 200. In this case, Developer 1 is selected as the most significant reviewer from the first level 402.

The second-level code reviewers of second level 404 in hierarchy 400 illustratively have weighted relevance scores that represent a weighted sum of all code portions committed in the same code areas as the given code portion. Their corresponding code portions may not be directly modified by the changes in the given code portion, but are still relevant based on the changes in the given code portion.

The third-level code reviewers of third level 406 in hierarchy 400 illustratively have weighted relevance scores that represent a weighted sum of all code changes in all active development branches. In a large software group, it is common that multiple features or software releases are developed concurrently by different groups at different global locations, and there is a chance that different developers will make changes in the same code area but in different development branches. Selection of a third-level code reviewer provides a mechanism to make such developers aware of potential conflicts resulting from upcoming changes associated with the given code portion.

It is to be appreciated that the automated relevance analysis described herein can also be tuned or otherwise adjusted with human intervention. For example, a designated code reviewer through use of one or more configuration files could potentially outweigh the weighted sums computed in the manner described above.

Numerous additional or alternative selection mechanisms can be implemented by the reviewer determination logic 108 of the automated code reviewing system 106 in other embodiments.

The particular arrangements shown in FIGS. 3 and 4 are presented by way of illustrative example only, and should not be considered limiting in any way. Other types of data structures, having different arrangements and types of entries, can be used in place of the weighted relevance score arrangement 300 and hierarchy 400 in other embodiments herein.

Illustrative embodiments of an information processing system with automated code review functionality as disclosed herein can provide a number of significant advantages relative to conventional arrangements.

For example, some embodiments advantageously provide techniques for automated code review using relevance analysis to control aspects of a code review process, such as selection of code reviewers and interaction with those code reviewers, to overcome significant drawbacks of alternative code review processes.

Such embodiments provide a highly-focused and effective interaction with relevant code reviewers for a given code portion, overcoming issues associated with diffusion of responsibility and overloading of component leads.

For example, some embodiments automatically identify the most critical code reviewers, reduce code review group size, clarify the responsibilities of each code reviewer, and distribute scope and load of each code reviewer to ensure timely high-quality code review regardless of other testing or integration processes.

Illustrative embodiments can therefore not only provide substantial reductions in delays that might otherwise be associated with performance of code review, but can also significantly improve the quality of the code review.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement at least a portion of an information processing system with automated code review functionality will now be described in greater detail with reference to FIGS. 5 and 6. Although described in the context of system 100, these platforms may also be used to implement at least portions of other information processing systems in other embodiments.

Figure 5:
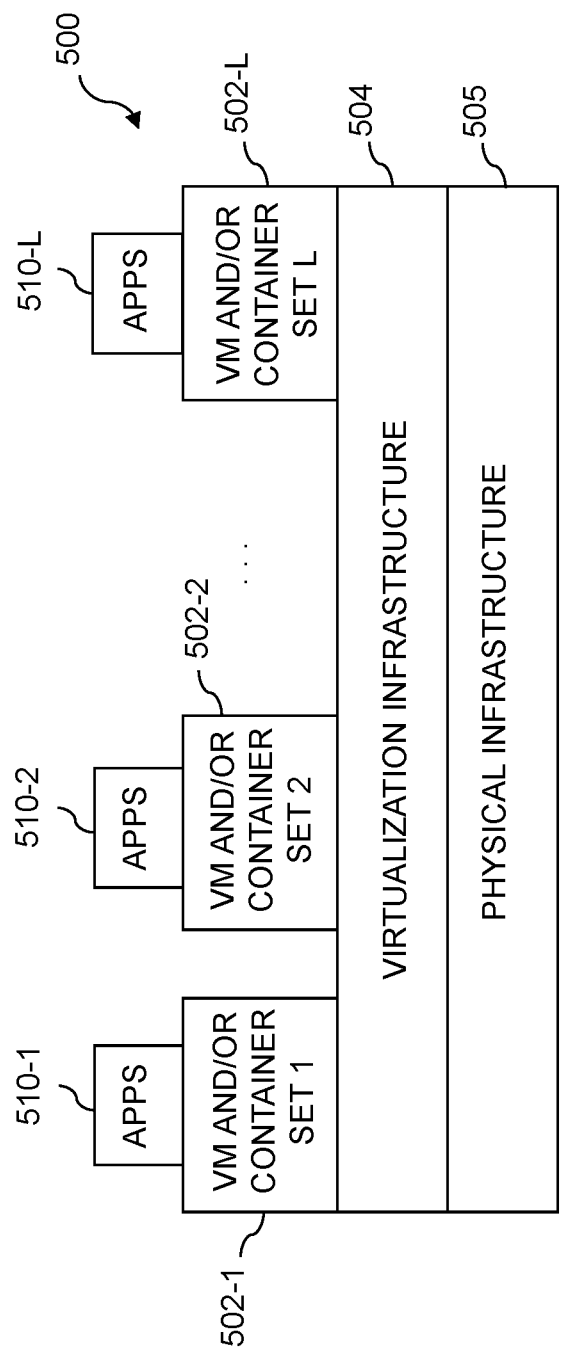
FIGS. 5 and 6 show examples of processing platforms that may be utilized to implement at least a portion of an information processing system in illustrative embodiments.
Figure 6:
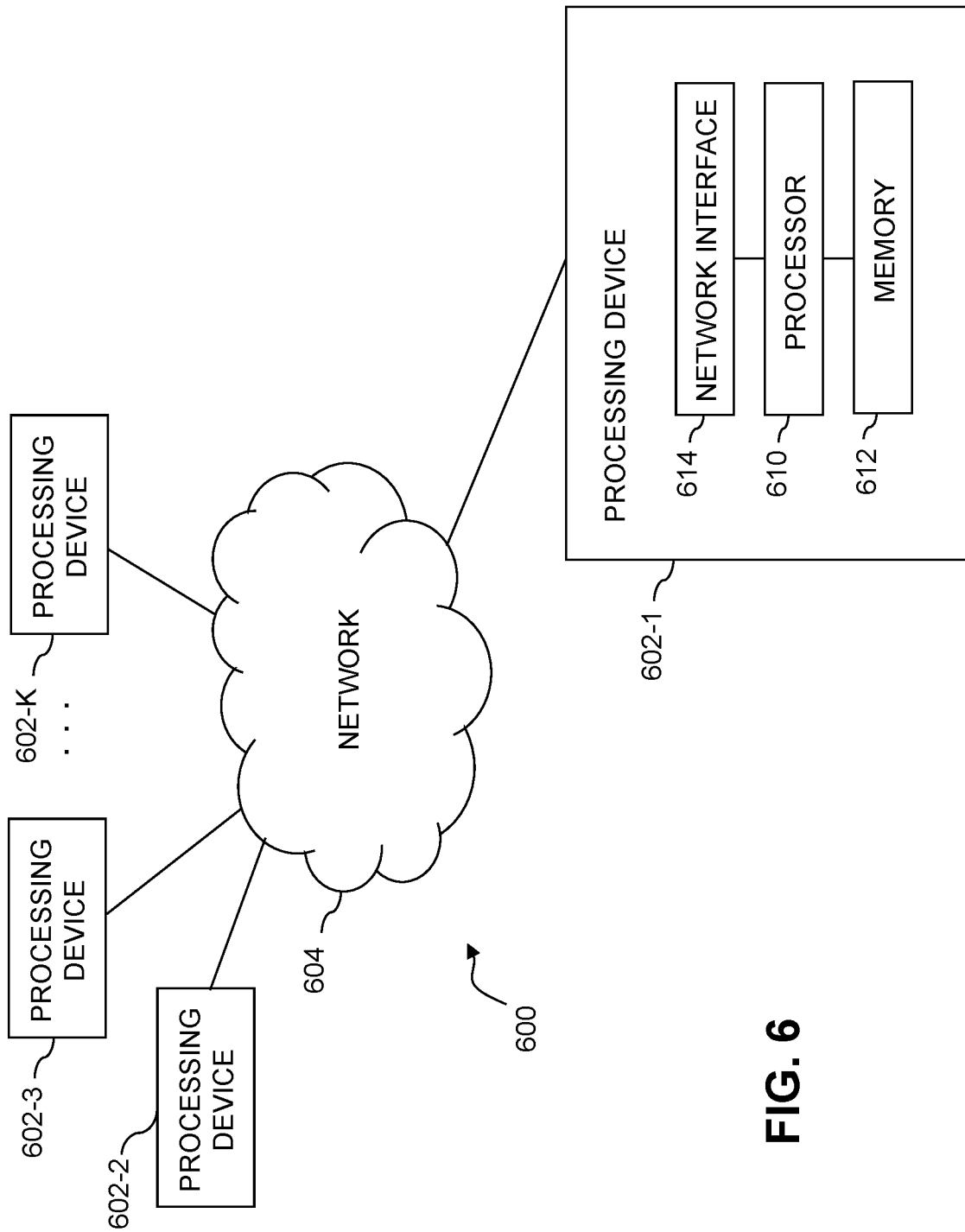

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide automated code review functionality of the type described above, illustratively using one or more processes running on a given one of the VMs. For example, each of the VMs can implement one or more instances of relevance analysis logic, reviewer determination logic and/or other components for supporting automated code review functionality in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide automated code review functionality of the type described above. For example, a container host device supporting multiple containers of one or more container sets can implement one or more instances of relevance analysis logic, reviewer determination logic and/or other components for supporting automated code review functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a graphics processing unit (GPU), a tensor processing unit (TPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell Technologies.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the automated code review functionality of an information processing system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, processing platforms, automated code reviewing systems, storage systems, automated code testing and integration systems, and additional or alternative components. Also, the particular configurations of system and device elements and associated processing operations illustratively shown in the drawings can be varied in other embodiments.

Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
said at least one processing device being configured:
for each of a plurality of commit operations to be executed for respective given code portions of a set of software code under development:
to perform a relevance analysis to identify one or more other code portions of the set of software code that each exhibits at least a threshold level of relevance to the given code portion;
to determine one or more code reviewers for the given code portion based at least in part on the one or more other code portions identified by the relevance analysis;
to assign code review responsibilities for the given code portion to the one or more determined code reviewers;
to notify the one or more determined code reviewers of the assigned code review responsibilities; and
responsive to successful completion of code review by the one or more determined code reviewers, to execute the commit operation for the given code portion.

2. The apparatus of claim 1 wherein said at least one processing device comprises a processing platform configured to implement an automated code reviewing system.

3. The apparatus of claim 1 wherein performing a relevance analysis to identify one or more other code portions of the set of software code that each exhibits at least a threshold level of relevance to the given code portion comprises processing code change history information for the set of software code under development to identify the one or more other code portions each exhibiting at least the threshold level of relevance to the given code portion.

4. The apparatus of claim 1 wherein performing a relevance analysis to identify one or more other code portions of the set of software code that each exhibits at least a threshold level of relevance to the given code portion comprises:
assigning different weights to respective ones of a plurality of code portions of the set of software code; and
computing weighted relevance scores for respective potential code reviewers associated with the plurality of code portions.

5. The apparatus of claim 4 wherein determining one or more code reviewers for the given code portion based at least in part on the one or more other code portions identified by the relevance analysis comprises selecting a potential code reviewer having a highest one of the weighted relevance scores as a determined code reviewer for the given code portion.

6. The apparatus of claim 4 wherein assigning different weights to respective ones of a plurality of code portions of the set of software code comprises one or more of:
assigning relatively high weights to more recently changed code portions and relatively low weights to less recently changed code portions;
assigning relatively high weights to code portions associated with bug fixes and relatively low weights to code portions not associated with bug fixes; and
assigning relatively low weights to code portions associated with trace messages and relatively high weights to code portions not associated with trace messages.

7. The apparatus of claim 1 wherein performing a relevance analysis to identify one or more other code portions of the set of software code that each exhibits at least a threshold level of relevance to the given code portion comprises executing one or more predetermined commands against a plurality of code portions of the set of software code.

8. The apparatus of claim 7 wherein the one or more commands comprise a differential command that when executed returns one or more code portions associated with each of one or more previous commit operations.

9. The apparatus of claim 7 wherein the one or more commands comprise an attribution command that when executed returns at least one code developer identifier and a corresponding commit identifier for one or more code portions associated with at least one previous commit operation executed for those code portions.

10. The apparatus of claim 7 wherein the one or more commands comprise at least one of a context command and a purpose command that when executed return respective corresponding context and purpose information for one or more code portions associated with at least one previous commit operation executed for those code portions.

11. The apparatus of claim 1 wherein determining one or more code reviewers for the given code portion based at least in part on the one or more other code portions identified by the relevance analysis comprises determining the one or more code reviewers for the given code portion subject to one or more specified review constraints, wherein the one or more specified review constraints designate one or more particular code reviewers for at least one of particular types of files, particular types of code structure, and particular types of directory changes.

12. The apparatus of claim 1 wherein determining one or more code reviewers for the given code portion based at least in part on the one or more other code portions identified by the relevance analysis comprises:
arranging identifiers of a plurality of potential code reviewers for the given code portion into a hierarchy of potential code reviewers for the given code portion based at least in part on results of the relevance analysis;
selecting a first level code reviewer from a first level of the hierarchy of potential code reviewers for the given code portion; and
selecting at least one additional code reviewer from at least one lower level of the hierarchy of potential code reviewers for the given code portion.

13. The apparatus of claim 11 wherein different code reviewers at different ones of the levels of the hierarchy perform code review at respective different granularities for the given code portion.

14. The apparatus of claim 11 wherein determining one or more code reviewers for the given code portion based at least in part on the one or more other code portions identified by the relevance analysis further comprises:
selecting a second level code reviewer from a second level of the hierarchy of potential code reviewers for the given code portion, the second level code reviewer being selected to perform code review based on identification of a particular component impacted by the given code portion; and
selecting a third level code reviewer from a third level of the hierarchy of potential code reviewers for the given code portion, the third level code reviewer being selected to perform code review based on a determination that the given code portion comprises code changes across multiple components in respective different directories.

15. A computer program product comprising a non-transitory processor-readable storage medium having stored therein program code of one or more software programs, wherein the program code when executed by at least one processing device causes said at least one processing device:
for each of a plurality of commit operations to be executed for respective given code portions of a set of software code under development:
to perform a relevance analysis to identify one or more other code portions of the set of software code that each exhibits at least a threshold level of relevance to the given code portion;
to determine one or more code reviewers for the given code portion based at least in part on the one or more other code portions identified by the relevance analysis;
to assign code review responsibilities for the given code portion to the one or more determined code reviewers;
to notify the one or more determined code reviewers of the assigned code review responsibilities; and
responsive to successful completion of code review by the one or more determined code reviewers, to execute the commit operation for the given code portion.

16. The computer program product of claim 15 wherein performing a relevance analysis to identify one or more other code portions of the set of software code that each exhibits at least a threshold level of relevance to the given code portion comprises:
assigning different weights to respective ones of a plurality of code portions of the set of software code; and
computing weighted relevance scores for respective potential code reviewers associated with the plurality of code portions.

17. The computer program product of claim 15 wherein determining one or more code reviewers for the given code portion based at least in part on the one or more other code portions identified by the relevance analysis comprises:
arranging identifiers of a plurality of potential code reviewers for the given code portion into a hierarchy of potential code reviewers for the given code portion based at least in part on results of the relevance analysis;
selecting a first level code reviewer from a first level of the hierarchy of potential code reviewers for the given code portion; and
selecting at least one additional code reviewer from at least one lower level of the hierarchy of potential code reviewers for the given code portion.

18. A method comprising:
for each of a plurality of commit operations to be executed for respective given code portions of a set of software code under development:
performing a relevance analysis to identify one or more other code portions of the set of software code that each exhibits at least a threshold level of relevance to the given code portion;
determining one or more code reviewers for the given code portion based at least in part on the one or more other code portions identified by the relevance analysis;
assigning code review responsibilities for the given code portion to the one or more determined code reviewers;
notifying the one or more determined code reviewers of the assigned code review responsibilities; and
responsive to successful completion of code review by the one or more determined code reviewers, executing the commit operation for the given code portion;
wherein the method is implemented by at least one processing device comprising a processor coupled to a memory.

19. The method of claim 18 wherein performing a relevance analysis to identify one or more other code portions of the set of software code that each exhibits at least a threshold level of relevance to the given code portion comprises:
assigning different weights to respective ones of a plurality of code portions of the set of software code; and
computing weighted relevance scores for respective potential code reviewers associated with the plurality of code portions.

20. The method of claim 18 wherein determining one or more code reviewers for the given code portion based at least in part on the one or more other code portions identified by the relevance analysis comprises:
arranging identifiers of a plurality of potential code reviewers for the given code portion into a hierarchy of potential code reviewers for the given code portion based at least in part on results of the relevance analysis;
selecting a first level code reviewer from a first level of the hierarchy of potential code reviewers for the given code portion; and
selecting at least one additional code reviewer from at least one lower level of the hierarchy of potential code reviewers for the given code portion.

* * * * *